(12) United States Patent
Merchant

(10) Patent No.: US 8,662,523 B1
(45) Date of Patent: Mar. 4, 2014

(54) LIGHT-WEIGHT TOW BAR AND LEG LOCK THEREFOR

(75) Inventor: David Merchant, Lincoln, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 338 days.

(21) Appl. No.: 13/136,762

(22) Filed: Aug. 10, 2011

(51) Int. Cl.
    *B60D 1/54* (2006.01)
(52) U.S. Cl.
    USPC .............. 280/493; 280/491.1; 280/491.2; 280/491.4
(58) Field of Classification Search
    USPC .......... 280/493, 482, 491.1, 491.4, 492, 494, 280/491.5; 403/322.4, 324; 292/139, 240, 292/241
    See application file for complete search history.

(56) References Cited

U.S. PATENT DOCUMENTS

| RE35,482 E | 3/1997 | Johnson |
| 5,765,851 A | 6/1998 | Parent |
| 5,957,477 A | 9/1999 | Ensz et al. |
| 7,390,007 B2 | 6/2008 | Helms et al. |
| 7,942,435 B1 | 5/2011 | Huston et al. |
| 7,959,179 B1 | 6/2011 | Merchant |
| 7,959,180 B1 | 6/2011 | Huston et al. |
| 7,988,179 B1 * | 8/2011 | Goodman et al. .......... 280/491.4 |
| 8,056,919 B1 * | 11/2011 | Huston et al. ................. 280/493 |
| 8,366,137 B1 * | 2/2013 | Merchant ...................... 280/493 |
| 8,505,952 B1 * | 8/2013 | Choquette .................. 280/491.2 |

* cited by examiner

*Primary Examiner* — Tony Winner
*Assistant Examiner* — Jacob Knutson
(74) *Attorney, Agent, or Firm* — Donald R. Schoonover

(57) ABSTRACT

A tow bar includes towing and towed hitch members; a head member with a front connector for connecting to the towing hitch member; tow bar legs connected to the head member, each tow bar leg including an outer member and an inner member telescopingly displaceable in the outer member; rear connectors to connect the inner members to the towed hitch member; and locking members each having a first portion adhesively secured to the distal end of the outer member, a second portion fixedly secured to the inner member, and a third portion including a transversely-oriented latch cavity through each inner member, biased opposing latches mounted in the latch cavity wherein the locking member automatically locks the respective inner and outer members relative to each other.

17 Claims, 3 Drawing Sheets

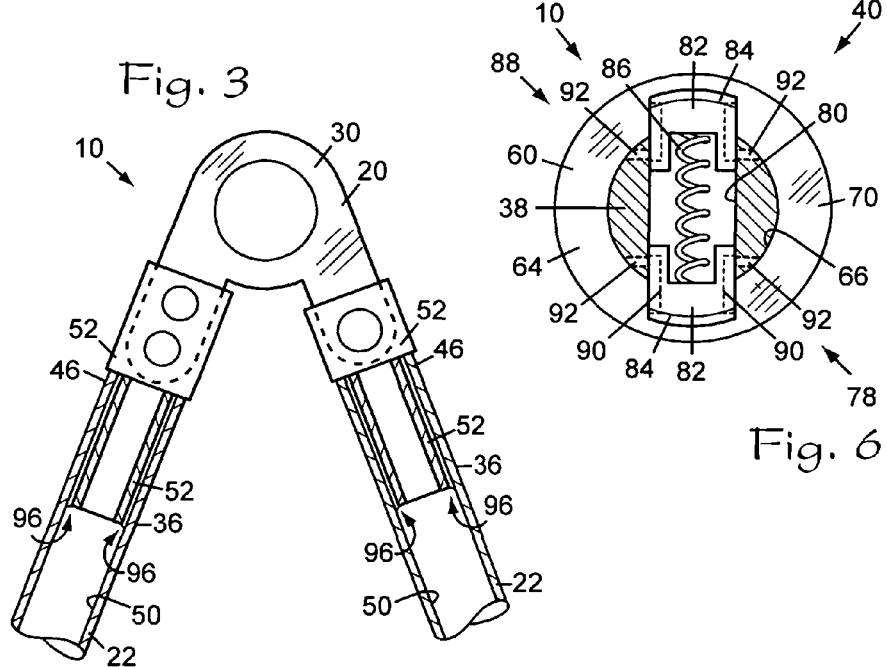
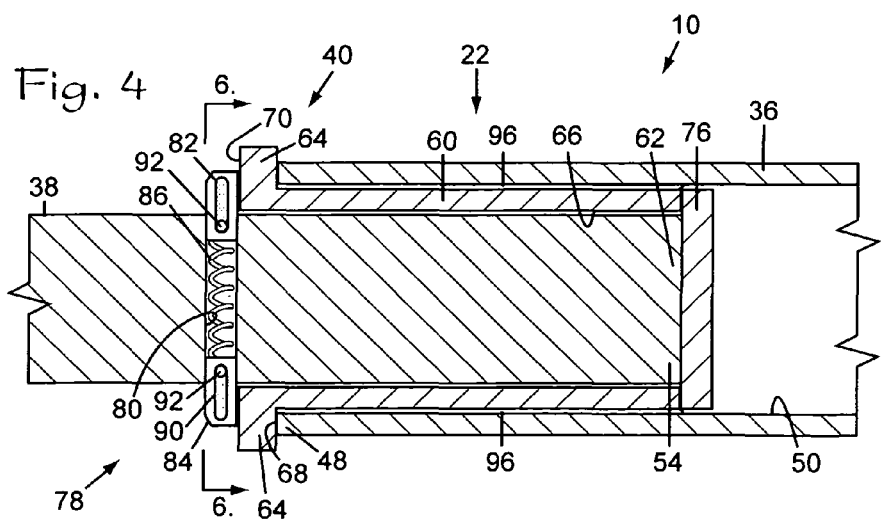

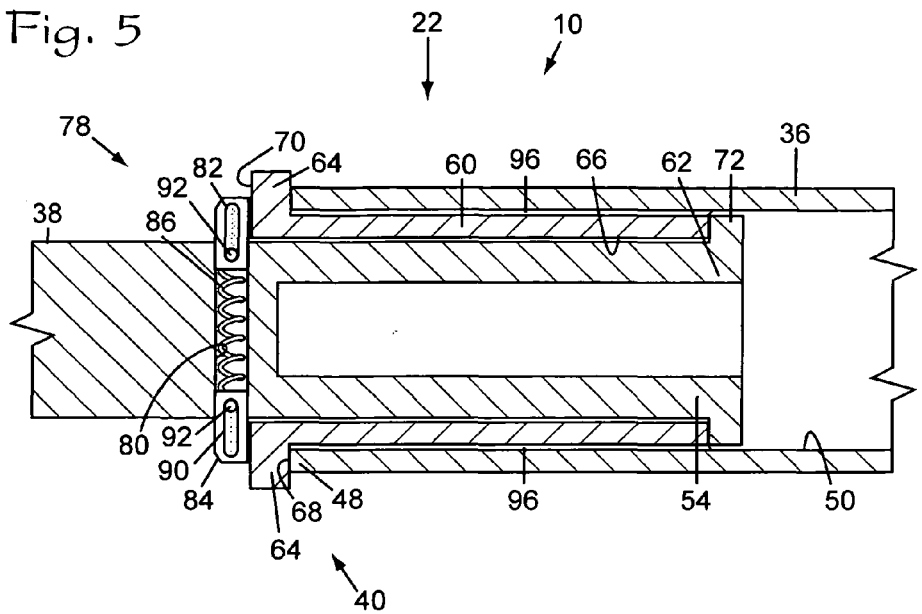
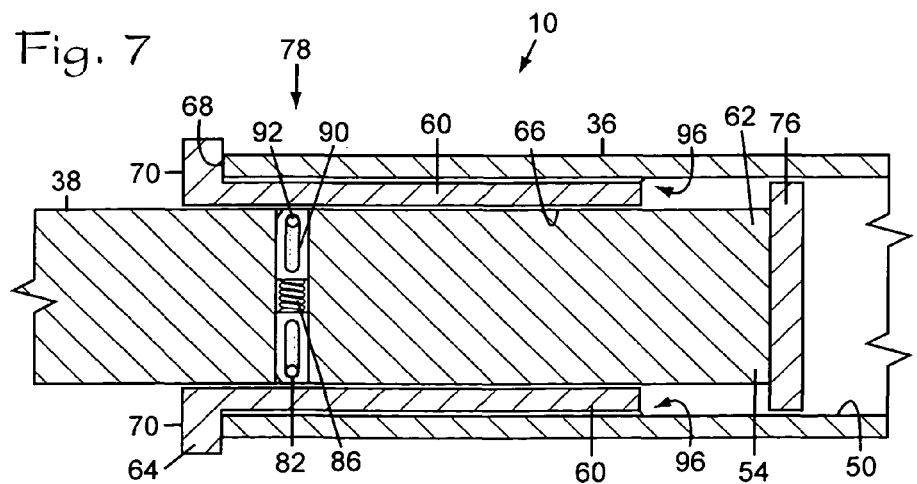

LIGHT-WEIGHT TOW BAR AND LEG LOCK THEREFOR

BACKGROUND OF THE INVENTION

1. Field of the Invention

The present invention relates to towing accessories and, more particularly without limitation, to tow bars for connecting a towing vehicle to a vehicle to be towed.

2. Description of the Related Art

A tow bar is generally used for connecting a towing vehicle to a vehicle to be towed, the latter sometimes being referred to herein as a towed vehicle. For applications wherein the towed vehicle will be towed at a speed sufficient to move with the flow of traffic on a public roadway, the tow bar, which connects the front end of the towed vehicle to the rear end of the towing vehicle, generally has two tow bar legs with the front ends of the tow bar legs forming the apex of an isosceles triangle and the rear ends of the tow bar legs being spaced apart to form the sides of the triangle. The triangular configuration causes the towed vehicle to closely track the towing vehicle along straightaways and around corners.

For tow bar applications, such as where heavy, massive equipment will be moved a relatively short distance, such as where an airliner is to be backed away from a terminal for example, the tow bar generally has only one tow bar leg. For such applications, one end of the tow bar leg may be connected to the front end of the vehicle to be moved and the other end of the tow bar leg being connected to the front end of the towing vehicle so the operator of the towing vehicle can face the towed vehicle and can carefully observe the response of the towed vehicle as it is being slowly moved by the towing vehicle.

Most tow bars must be designed to accommodate variations in attitude that inherently exist between towing and towed vehicles, which variations are constantly and continuously changing. One such variation in attitude between the vehicles is the instantaneous sidewise tilt of the towing vehicle relative to the instantaneous sidewise tilt of the towed vehicle, such as the rocking motion which occurs when traversing uneven or rough pavement for example. This phenomenon, sometimes referred to as "roll", can be accommodated by tow bar apparatus designed to accommodate rotations between the towing and towed vehicles about a longitudinal, horizontal axis, see the "x"-axis in FIG. 1.

Another such variation in attitude between the vehicles is the instantaneous horizontal direction in which the towing vehicle is traveling relative to the instantaneous horizontal direction in which the towed vehicle is traveling, such as when the towed vehicle is being pulled around an unbanked corner for example. This phenomenon, sometimes referred to as "yaw", can be accommodated by apparatus designed to accommodate rotations between the towing and towed vehicles about a vertical axis, see the "y"-axis in FIG. 1.

Finally, another such variation in attitude between the vehicles is the instantaneous elevation of the towing vehicle relative to the instantaneous elevation of the towed vehicle. A related variation in attitude between the vehicles is the instantaneous ascent/descent orientation of the towing vehicle relative to the instantaneous ascent/descent orientation of the towed vehicle. Both of these related variations in attitude can be accommodated by apparatus designed to accommodate rotations between the towing and towed vehicles about a transverse, horizontal axis, sometimes referred to as the "pitch" axis, see the "z"-axis in FIG. 1.

During actual towing operations, all combinations of roll, yaw and pitch are continuously occurring and changing. Prior art is replete with tow bar designs that have been developed in an attempt to accommodate these phenomena, some of those designs being more successful than others. For example, a ball hitch/ball hitch receiver combination securing a tow bar to a towing vehicle can theoretically accommodate all three of the roll, yaw and pitch phenomena. Although the ability of such a combination to accommodate yaw is encouraging, unfortunately the ability of such a combination to accommodate either pitch or roll is extremely limited, where failure to closely abide by those limitations can produce disastrous and even fatal results.

A commonly used arrangement involves using a conventional receiver hitch in combination with a square hitch tube. Although such an arrangement may be convenient for connecting a tow bar to a towing vehicle, this type of connection by itself provides absolutely no ability to accommodate any one of the three roll, yaw or pitch phenomena. As a result, the tow bar itself and/or the connections between the tow bar and the towed vehicle must be relied upon to provide a solution for minimizing the potentially dangerous aspects of these phenomena.

At the same time, an ability to apply such rotations could be very useful while connecting a tow bar to a towed vehicle. Typically, a tow bar is first connected to a towing vehicle followed by connecting the tow bar to the towed vehicle. It is difficult, if not impossible, to perfectly align a towing vehicle with, and perfectly space the towing vehicle from, the towed vehicle so the tow bar legs can be easily and conveniently connected to the towed vehicle. Many towing hitch arrangements of towed vehicles require precise fore-to-aft, horizontal, and angular alignment of the two tow bar leg connectors with the mating connectors of the towing hitch arrangement of the towed vehicle so pivot pins can be inserted horizontally through horizontally-aligned orifices of those mating connectors while the mating parts of the tow bar are physically held in place relative to those of the towed vehicle. Such activity can be extremely stressful, sometimes requiring the efforts of more than one person, such as when connecting very heavy tow bars used for towing massive military equipment or heavy construction equipment for example. Such stress and effort could be substantially reduced if a tow bar could be constructed of light-weight, high-strength material. Such materials have been developed but most are either too expensive for use in tow bar construction, or are frangible and cannot reliably endure the adverse environment to which tow bars are subjected, particularly when the frangible material must be penetrated in order to assemble the various components of a tow bar. Such penetrations severely degrade the structural integrity of many apparatii, particularly tow bars, constructed from such material.

What is needed is a tow bar constructed of light-weight, high-strength materials which one person working alone can easily lift and use to connect a towing vehicle to a towed vehicle.

What is also needed is a tow bar constructed of light-weight, high-strength materials, including frangible material, which one person working alone can easily lift and use to connect a towing vehicle to a towed vehicle.

What is further needed is a tow bar constructed of light-weight, high-strength materials, including frangible material, which can be assembled without penetrating the frangible material.

What is still further needed is a locking member for a tow bar constructed of light-weight, high-strength materials, including frangible material, wherein the locking member does not require penetration of the frangible material.

SUMMARY OF THE INVENTION

The improvements of the present invention for a light-weight tow bar for connecting a towing vehicle to a vehicle to be towed, and leg lock therefor, include a towing hitch member connected to a towing vehicle; a towed hitch member connected to a vehicle to be towed; a head member having a forwardly-extending front connector for releasably connecting the head member to the towing hitch member; tow bar legs; locking members; and rear connectors for releasably connecting the tow bar legs to the towed hitch member.

Each tow bar leg includes an outer member having a proximal end, a distal end, and an inner surface; an inner member having a proximal end telescopingly displaceable in the distal end of the outer member; and a locking member.

Each locking member includes a first portion with a fore end adhesively secured to the inner surface of the distal end of the outer member, an aft end, and an orifice extending from the aft end to the fore end wherein the orifice is dimensioned to allow the inner member to be slidably displaceable therethrough.

Each locking member also includes a second portion either fixedly secured to the proximal end of the respective inner member, or integrally formed with the proximal end of the respective inner member.

Each locking member further includes a third portion including a transversely-oriented latch cavity through the respective inner member; a pair of opposing latches mounted in each latch cavity wherein the pair of opposing latches are radially-displaceable relative to the inner member with each of the latches having a rearwardly-facing beveled edge; resilient mechanisms biasing the pairs of opposing latches radially outwardly; and retainer elements structured to restrict the extent of lateral displacement of each of the latches. Each latch cavity is spaced from the respective second portion wherein, as the respective inner member is being displaced rearwardly relative to the respective outer member and the second portion abuttingly engages the fore end of the respective first portion, the respective pair of opposing latches are automatically displaced radially outwardly thereby releasably locking the respective inner and outer members relative to each other.

At least the outer members of the tow bar are constructed of woven fiber fabric embedded in an epoxy resin.

PRINCIPAL OBJECTS AND ADVANTAGES OF THE INVENTION

The principal objects and advantages of the present invention include: providing a tow bar constructed of light-weight, high-strength materials which one person working alone can easily lift and use to connect a towing vehicle to a towed vehicle; providing such a tow bar constructed of light-weight, high-strength materials, including frangible material, which one person working alone can easily lift and use to connect a towing vehicle to a towed vehicle; providing such a tow bar constructed of light-weight, high-strength materials, including frangible material, which can be assembled without penetrating the frangible material; providing a locking member for such a tow bar constructed of light-weight, high-strength materials, including frangible material, wherein locking members thereof do not require penetration of the frangible material; and generally providing such a tow bar that is easily-constructed, reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 3 is an enlarged, fragmentary and partially cross-sectional plan view of a head member, leg connectors and proximal ends of outer members of tow bar legs of the tow bar.

FIG. 4 is a further enlarged and partially cross-sectional side elevational view showing a locking member of the tow bar in a locked configuration.

FIG. 5 is a further enlarged and partially cross-sectional, fragmentary side elevational view of an alternative locking member of the tow bar, similar to FIG. 4 but showing a hollow second portion formed integrally with a hollow proximal end of an inner member, according to the present invention.

FIG. 6 is a further enlarged view taken along line 6-6 of FIG. 4 of the tow bar.

FIG. 7 is a further enlarged and partially cross-sectional side elevational view similar to FIG. 4, but showing the locking member in an unlocked configuration, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
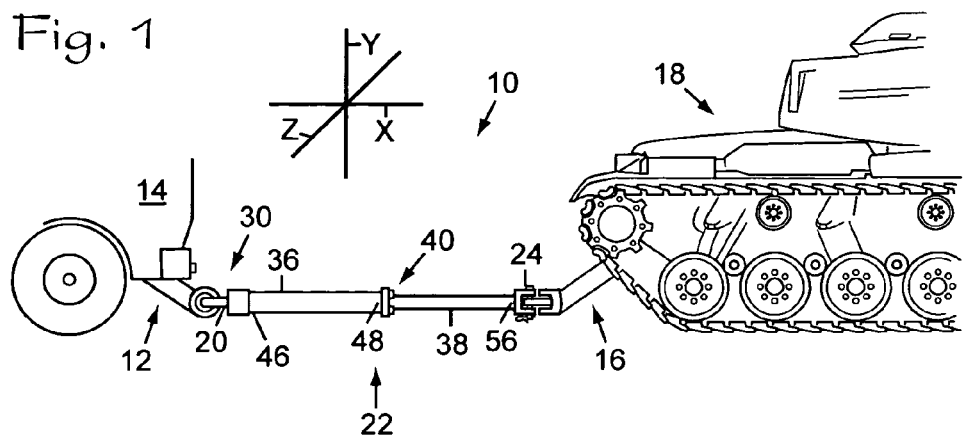
FIG. 1 is a side elevational view of a tow bar in use, according to the present invention.
Figure 2:
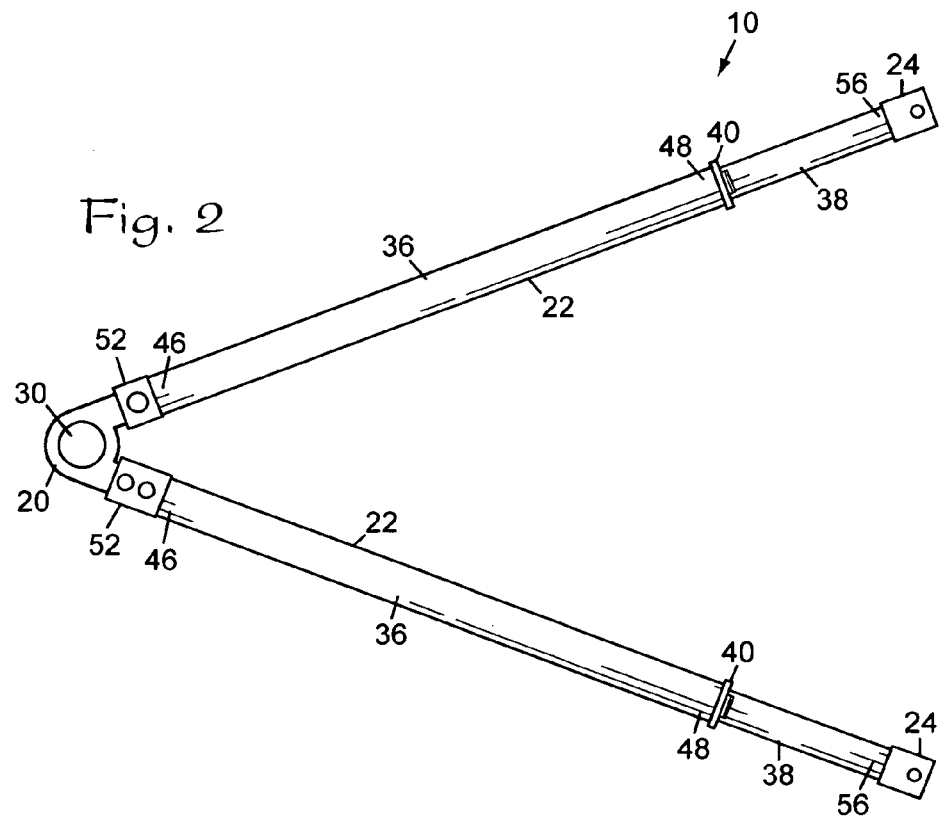
FIG. 2 is a top plan view of the tow bar.

The reference numeral 10 generally refers to a light-weight tow bar for connecting a towing vehicle to a vehicle to be towed in accordance with the present invention, as shown in FIGS. 1 through 7. The tow bar 10 includes a towing hitch member 12 of a towing vehicle 14, a towed hitch member 16 of a towed vehicle 18, a head member 20, a pair of tow bar legs 22, and rear connectors 24.

The head member 20 includes a forwardly-extending front connector 30 structured to releasably connect the tow bar to the towing hitch member 12. The front connector 30 and towing hitch member 12 may comprise any desirable combination, such as a hitch ball receiver and a hitch ball, or a hitch tube and a conventional receiver hitch, for example. Due to the substantially greater towing capability enabled by the materials, structure and reduced overall weight of the tow bar disclosed herein, it is foreseen that many applications of the tow bar 10, and particularly for military applications, will utilize a pintle hitch 12 as part of the towing hitch member 16 and a lunette ring 30 as part of the front connector 30.

Each of the tow bar legs 22 includes an outer member 36, an inner member 38, and a locking member 40. The following is sometimes described in terms of one of the tow bar legs 22.

It is to be understood, however, that the description applies equally to each of the tow bar legs 22.

Each outer member 36 includes a proximal end 46, a rearwardly-extending distal end 48, and an inner surface 50. A pair of leg connectors 52 are structured to connect the tow bar legs 22 to the head member 20. Each tow bar leg 22 is adhesively secured to a respective one of the pair of leg connectors 52. Preferably, at least one of the leg connectors 52 is pivotally connected to the head member 20. Since the outer members 36 of a tow bar are generally the heaviest parts thereof, the overall weight of a tow bar 10 as disclosed herein is substantially reduced by constructing the outer members 36 of a high-strength, light-weight composite material, such as woven fiber fabric embedded in an epoxy resin as provided by Allred & Associates of Elbridge, New York under Dragon Platem, or other suitable high-strength, light-weight and/or composite material. For example, the material used for the fibers of a woven fabric may include one or more of kevlar, S-glass (alumino-silicate glass without CaO but with high MgO content with high tensile strength) or E-glass (alumino-borosilicate glass) as provided by US Composites of West Palm Beach, Fla., or any other suitable fiber material.

Other than the outer members 36, the inner members 38 and most of the other components described herein are constructed of another light-weight material such as aluminum 7075T6, or another suitable light-weight aluminum or other material, to thereby minimize the overall weight of the tow bar 10 while retaining necessary strength requirements without compromising desired ruggedness of the tow bar. In an application of the present invention to a tow bar constructed of materials and structured as disclosed herein, the overall weight thereof was approximately fifty pounds instead of approximately two hundred fifty pounds.

Each inner member 38 includes a proximal end 54 telescopingly displaceable in the distal end 48 of the outer member 36, and a rearwardly-extending distal end 56.

Each locking member 40 includes a transversely-oriented latch cavity 80. Each locking member 40 also includes a first portion 60 having a fore end 62, an aft end 64, and an orifice 66. The aft end 64 of the first portion 60 extends radially-outwardly, as shown in FIG. 4, to protect distal edge 68 of the outer member 36 and to provide a sizeable bearing surface 70 as hereinafter described. The orifice 66 extends from the aft end 64 of the first portion 60 to the fore end 62 of the first portion 60 and is dimensioned to allow the inner member 38 to be slidably displaceable therethrough.

Each locking member 40 further includes a second portion 76 having a diameter greater than the diameter of the orifice 66 of the first portion 60. The second portion 76 is fixedly secured to the proximal end 54 of the inner member 38, as shown in FIG. 4. It is to be understood that for some applications it may be desirable to form the second portion 76 integrally with the proximal end 54 of the inner member 38. Accordingly, an alternative structure is shown in FIG. 5 and designated by numeral 72; the alternative structure is also shown as hollowed to further reduce the overall weight of the tow bar. For some applications, it may be desirable to similarly hollow one or both of the second portion 76 and the proximal end 54 of the inner member 38 when not integrally formed.

Each locking member 40 still further includes a third portion 78 mounted in the transversely-oriented latch cavity 80 through the inner member 38, as shown in FIG. 6. The third portion 78 includes at least one transversely displaceable latch 82 having a rearwardly-facing beveled edge 84. Preferably, the at least one latch 82 includes a pair of opposing latches 82, each having the rearwardly-facing beveled edge 84. The latch cavity 80 is appropriately spaced from the second portion 76 in order to automatically lock the outer and inner members 36, 38 relative to each other as hereinafter explained.

A resilient member 86, such as a spring 86 for example, is structured to bias the latches 82 radially outwardly relative to the inner member 38. Retainer elements 90 are structured to restrict the extent of lateral displacement of the latches 82. For example, the retainer elements 90 may include slots 90 formed in opposing sides of each latch 82, as indicated in FIGS. 4 and 6. Adjustable set screws 92, mounted in the inner member 38, protrude into the slots 90 to thereby limit the travel of the latches 82.

The rear connectors 24, which are secured to the distal ends 56 of the inner members 38, are structured to pivotally and releasably connect the inner members 38 to the towed hitch member 16.

During assembly of each tow bar leg 22, the inner member 38 is connected to the outer member 36 by fixedly securing the first portion 60 of the locking member 40 to the inner surface 50 of the outer member 36 with an adhesive 96, such as epoxy 96 or other suitable adhesive. It should be noted that the adverse environment to which the tow bar will be subjected involves extremely large strains and stresses, particularly when used for towing very heavy military vehicles and the like. As a result, it is essential that any and all penetrations of a frangible material used in a tow bar environment must be kept to an absolute minimum or entirely eliminated—thus the use of an appropriate adhesive. It should be noted that penetrations through the outer member 38 of the disclosed tow bar 10 have been entirely eliminated.

In an application of the present invention, the latches 82 are manually squeezed toward each other to overcome the bias of the resilient mechanism 86 until the outer ends of the latches 82 can be displaced into orifice 66 thereby allowing the proximal end 54 of each inner member 38 to be displaced farther into the respective outer member 36, as shown in FIG. 7. The towing vehicle is then positioned in front of the vehicle to be towed. With the front connector 30 secured to the towing hitch member 12 of the towing vehicle, each tow bar leg 22 is independently manipulated to connect its rear connector 24 to the towed hitch member 16.

Then, as the towing vehicle 14 is slowly driven forward, each of the inner members 38 is pulled outwardly from its respective outer member 36. An inner member 38 may be sufficiently displaced into its outer member 36 such that the latches 82 are disposed between the first portion 60 and the head member 20. In that event, as the inner member 38 is being pulled outwardly relative to its respective outer member 36 wherein the latches 82 abutting engage the first portion 60, the beveled edges 84 of the latches 82 enable the latches 82 to be displaced radially-inwardly in the latch cavity 80 to thereby allow the latches 82 to re-enter the orifice 66 whereupon the inner member 38 continues to be displaced outwardly relative to its outer member 36, again as shown in FIG. 7.

The spacing between each latch cavity 80 and its respective second portion 76 is such that as the second portion 76 abuttingly engages the fore end 62 of the respective first portion 60, the latches 82 simultaneously clear the distal edge 68 of the first portion 60, whereupon the latches 82 are automatically displaced radially outwardly by the respective resilient member 86 to be disposed immediately adjacent to the respective bearing surface 70, thereby releasably locking the respective inner and outer members relative to each other, as shown in FIG. 4.

The second portion 76 abutting the fore end 62 of the first portion 60 operationally prevents the inner member 38 from being displaced further rearwardly relative to its outer member 36, and the latches 82 abutting the bearing surface 70 operationally prevents the inner member 38 from being displaced inwardly relative to its outer member 36. When both tow bar legs 22 are so locked, each tow bar leg 22 is locked at a desired length for towing the towed vehicle behind the towing vehicle.

When the tow bar has been disconnected from the towing and towed vehicles, it may be desirable to squeeze the respective pairs of latches 82 toward each other so the inner members 38 can be slidingly displaced farther into their outer members 36 for storage purposes.

It is to be understood that while certain forms of the present invention have been illustrated and described herein, it is not to be limited to the specific forms or connection of parts as described and shown.

What is claimed and desired to be covered by Letters Patent is as follows:

1. A tow bar for connecting a towing vehicle to a vehicle to be towed, the tow bar comprising:
   (a) a towing hitch member connected to a towing vehicle;
   (b) a towed hitch member connected to a vehicle to be towed;
   (c) a head member having a forwardly-extending front connector structured to releasably connect the head member to the towing hitch member;
   (d) a pair of tow bar legs, each tow bar leg including:
      (1) an outer member having a proximal end, a rearwardly-extending distal end, and an inner surface,
      (2) an inner member having a proximal end, and a rearwardly-extending distal end,
      (3) a locking member having:
         (A) a first portion with a fore end adhesively secured to the inner surface of the outer member at the distal end thereof, an aft end, and an orifice extending from the aft end to the fore end, the orifice being dimensioned to allow the inner member to be slidably displaceable therethrough,
         (B) a second portion fixedly secured to the proximal end of the inner member, and
         (C) a third portion including:
            (i) a transversely-oriented latch cavity through the inner member,
            (ii) a pair of opposing latches mounted in the latch cavity wherein the pair of opposing latches are radially-displaceable relative to the inner member, and
            (iii) a resilient element biasing the pair of opposing latches radially outwardly,
            (iv) the latch cavity being spaced from the second portion wherein, as the inner member is being displaced rearwardly relative to the outer member and the second portion abuttingly engages the fore end of the first portion, the pair of opposing latches are automatically displaced radially outwardly thereby releasably locking the inner and outer members relative to each other, and
      (4) a pair of leg connectors structured to connect the pair of tow bar legs to the head member, each tow bar leg being adhesively secured to a respective one of the pair of leg connectors;
   (e) rear connectors pivotally secured to respective distal ends of the inner members and structured to releasably connect the inner members to the towed hitch member.

2. A tow bar as described in claim 1, wherein the towing hitch member includes a pintle hitch, and the head member includes a lunette ring.

3. A tow bar as described in claim 1, wherein at least one of the pair of leg connectors pivotally connects the respective tow bar leg to the head member.

4. A tow bar as described in claim 1, wherein each second portion is formed integrally with the proximal end of the respective inner member.

5. A tow bar as described in claim 1, wherein each latch includes a rearwardly-facing beveled edge.

6. A tow bar as described in claim 1, wherein the resilient element includes a spring.

7. A tow bar as described in claim 1, wherein each third portion includes a retainer element structured to restrict the extent of lateral displacement of the respective pair of opposing latches.

8. A tow bar as described in claim 1, wherein each latch of the pair of opposing latches includes a retainer element having:
   (a) at least one slot; and
   (b) an adjustable mechanism extendable into each at least one slot.

9. A tow bar as described in claim 1, wherein each outer member is constructed of woven fiber fabric embedded in an epoxy resin.

10. A tow bar as described in claim 9, wherein the material of the fibers of the woven fabric is selected from at least one of a group consisting of kevlar, S-glass, E-glass, and carbon fiber.

11. A tow bar for connecting a towing vehicle to a vehicle to be towed, the tow bar comprising:
   (a) a towing hitch member including a pintle hitch connected to a towing vehicle;
   (b) a towed hitch member connected to a vehicle to be towed;
   (c) a head member having a forwardly-extending lunette ring structured to releasably connect the head member to the pintle hitch;
   (d) a pair of tow bar legs, each tow bar leg including:
      (1) an outer member having a proximal end, a rearwardly-extending distal end, and an inner surface,
      (2) an inner member having a proximal end, and a rearwardly-extending distal end,
      (3) a locking member having:
         (A) a first portion with a fore end adhesively secured to the inner surface of the outer member at the distal end thereof, an aft end, and an orifice extending from the aft end to the fore end, the orifice being dimensioned to allow the inner member to be slidably displaceable therethrough,
         (B) a second portion fixedly secured to the proximal end of the inner member, and
         (C) a third portion including:
            (i) a transversely-oriented latch cavity,
            (ii) a pair of opposing latches mounted in the latch cavity wherein the pair of opposing latches are radially-displaceable relative to the inner member, each latch having a rearwardly-facing beveled edge,
            (iii) a resilient mechanism including a spring structured to bias the pair of opposing latches radially outwardly, and
            (iv) a retainer element structured to restrict the extent of lateral displacement of each of the latches, (v) the latch cavity being spaced from the second portion wherein, as the inner member is being displaced rearwardly relative to the outer member and the second portion abuttingly engages the fore end of the first portion, the pair of opposing latches are automatically displaced radially outwardly thereby releasably locking the inner and outer members relative to each other; and (e) rear connectors pivotally secured to respective distal ends of the inner members and structured to releasably connect the inner members to the towed hitch member;

(f) wherein at least the outer members are constructed of woven fiber fabric embedded in an epoxy resin.

12. A lock for a tow bar leg having a outer member with a distal end and an inner surface, and an inner member with a proximal end telescopingly displaceable in the distal end of the outer member, the lock comprising:

(a) a first portion with a fore end adhesively secured to an inner surface at a distal end of an outer member of a tow bar leg; an aft end; and an orifice extending from the aft end to the fore end, the orifice being dimensioned to allow an inner member of the tow bar leg to be slidably displaceable therethrough;

(b) a second portion fixedly secured to the proximal end of the inner member of the tow bar leg; and (c) a third portion including:
 (1) a transversely-oriented latch cavity formed through the inner member of the tow leg,
 (2) a pair of opposing latches mounted in the latch cavity, the pair of opposing latches being radially displaceable relative to the inner member, and
 (3) a resilient element biasing the pair of opposing latches radially outwardly,
 (4) the latch cavity being spaced from the second portion wherein, as the inner member of the tow bar leg is being displaced rearwardly relative to the outer member of the tow bar leg and the second portion abuttingly engages the fore end of the first portion, the pair of opposing latches are automatically displaced radially outwardly thereby releasably locking the inner and outer members of the tow bar leg relative to each other.

13. A lock for a tow bar leg as described in claim 12, wherein each latch includes a rearwardly-facing beveled edge.

14. A lock for a tow bar leg as described in claim 12, wherein the resilient element includes a spring.

15. A lock for a tow bar leg as described in claim 12, wherein the third portion includes a retainer element structured to restrict the extent of lateral displacement of each one of the pair of opposing latches.

16. A lock for a tow bar leg as described in claim 12, wherein each latch of the pair of opposing latches includes a retainer element having:

(a) at least one slot; and (b) an adjustable mechanism extendable into each at least one slot.

17. A lock for a tow bar leg having a outer member with a distal end and an inner surface, and an inner member with a proximal end telescopingly displaceable in the distal end of the outer member, the lock comprising:

(a) a first portion with a fore end adhesively secured to an inner surface at a distal end of an outer member of a tow bar leg; an aft end; and an orifice extending from the aft end to the fore end, the orifice being dimensioned to allow an inner member of the tow bar leg to be slidably displaceable therethrough;

(b) a second portion fixedly secured to the proximal end of the inner member of the tow bar leg; and (c) a third portion including:
 (1) a transversely-oriented latch cavity formed through the inner member of the tow bar leg,
 (2) a pair of opposing latches mounted in the latch cavity, the pair of opposing latches being radially displaceable relative to the inner member, each latch having a rearwardly-facing beveled edge,
 (3) a resilient element including a spring structured to bias the pair of opposing latches radially outwardly, and
 (4) a retainer element structured to restrict the extent of lateral displacement of each of the latches,
 (5) the latch cavity being spaced from the second portion wherein, as the inner and outer members of the tow bar leg are being displaced relative to each other and the second portion abuttingly engages the fore end of the first portion, the pair of opposing latches are automatically displaced radially outwardly thereby releasably locking the inner and outer members relative to each other.

* * * * *